(No Model.)
O. B. HALL.
TIRE.
No. 604,750.    Patented May 31, 1898.
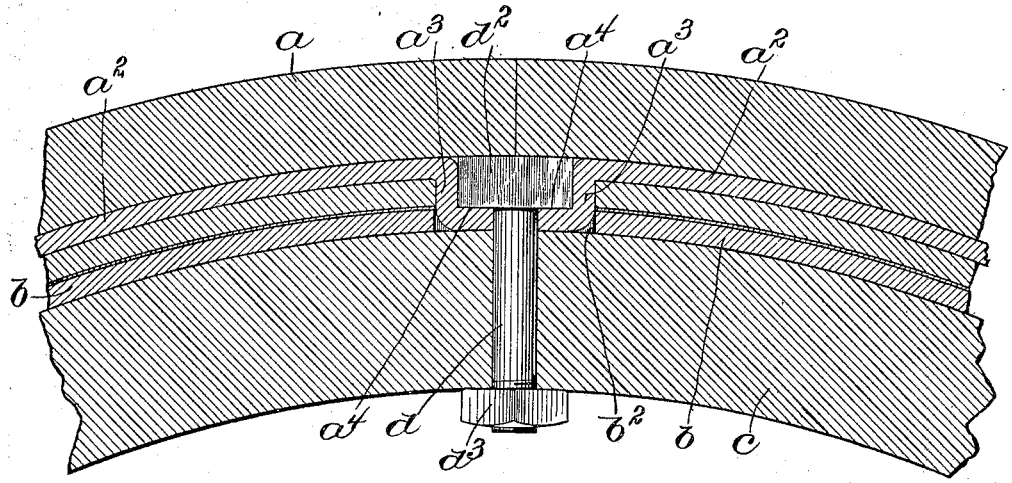
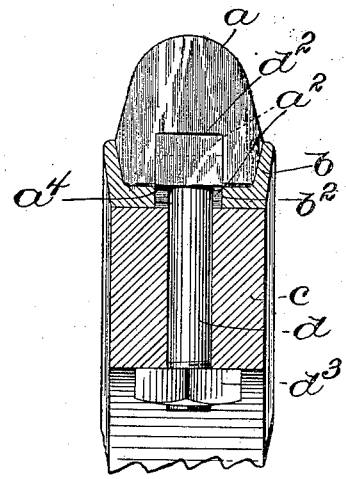
Witnesses,
Jas. J. Maloney.
Nancy P. Ford.
Inventor.
Osborn B. Hall.
by J. P. & H. J. Livermore
Attys.

UNITED STATES PATENT OFFICE.

OSBORN B. HALL, OF MALDEN, MASSACHUSETTS.

TIRE.

SPECIFICATION forming part of Letters Patent No. 604,750, dated May 31, 1898.

Application filed March 14, 1898. Serial No. 673,766. (No model.)

*To all whom it may concern:*

Be it known that I, OSBORN B. HALL, of Malden, county of Middlesex, and State of Massachusetts, have invented an Improvement in Tires, of which the following description, in connection with the accompanying drawings, is a specification, like letters on the drawings representing like parts.

The present invention relates to a rubber tire and the means for securing the same to a wheel-rim, the tire being of that type in which the rubber tread portion is laterally confined in a metallic channel suitably secured to the outside of the rim proper. Tires of this type have heretofore been commonly secured by wires or tapes embedded in the rubber and extending longitudinally around the wheel within the rubber, the said wires being welded together where they meet, so as to afford a continuous band to hold the rubber in place, or the tapes pulled through and fastened to the rim. In practice it is found that the wires or tapes frequently stretch, so that the tire loosens and is liable to come off. The object of the present invention is to obviate these difficulties by employing a fastening-strip which is practically incapable of stretching and to secure the ends of the said strip together and to the wheel by means of a mechanical fastening device capable of being manipulated by any one without any special skill. To these ends the fastening device embodying the invention consists of a bar or strip of metal extending longitudinally through the rubber tread portion of the tire, the said bar being of sufficient size to obviate all tendency toward stretching and practically constituting an inner steel tire. At the ends of the rubber tread portion the ends of the said bars are provided with rigid vertical shoulders adapted to extend into an opening formed in the metallic channel-piece and to be engaged by the said channel-piece at the edges of said opening and longitudinally held in position thereby. Each of the said ends is further provided with a rigid horizontal shoulder to be engaged by a locking device, which is shown as consisting of a bolt having a head adapted to overlie both of said shoulders and a shank to extend through an opening in the rim and to be secured in position by means of a nut.

The terms "vertical" and "horizontal" are to be understood as meaning substantially vertical and horizontal with relation to the axis of the wheel, the vertical shoulder being practically radial to said axis and the horizontal shoulder transverse thereto. At the point where the vertical shoulder is formed the rubber is cut away, so as not to interfere with the same, the upper portion of the rubber tread, however, extending beyond the strip, so that when the tire is in position the ends of the rubber portion will meet to form a continuous tread-surface. To apply the tire, therefore, (the tire being furnished with the fastening-strip applied thereto,) it is necessary only to place the rubber tread portion and contained strip in position in the channel-piece and push the ends of the tread portion back along the fastening-strip far enough to insert the locking-bolt and then insert and tighten up the said locking-bolt.

Figure 1 is a longitudinal section of a wheel-rim having a tire embodying the invention applied thereto, and Fig. 2 is a transverse section of the same.

The tire embodying the invention consists of the rubber tread portion $a$, which may be of any suitable or usual shape, and the metallic channel portion $b$, which is directly secured to the wheel-rim $c$ and which affords the direct means for laterally supporting or retaining the said tread portion. The said channel $b$ may be secured to the rim in any suitable or usual way and is ordinarily permanently secured thereto, since the only portion of a rubber tire which is likely to become worn and damaged and to require renewal apart from renewal of the entire wheel is the rubber tread portion $a$. To secure the said tread portion in the channel so that it will be held firmly in contact therewith and incapable of being displaced by stretching, the said tread portion is provided, in accordance with the present invention, with a metallic fastening-strip $a^2$, which is threaded longitudinally through a suitable opening in the rubber tread portion $a$ between the tread-surface thereof and the surface which lies in contact with the channel-piece. To lock the said fastening-strip in position after the tire has been applied to the wheel, the said strip is shown as provided at each end with a vertical or radial shoulder $a^3$, adapted to pass through an opening $b^2$ in the channel-piece $b$, the said opening being of such length that when the tread portion and fastening-strip have been drawn to their proper position the shoulders $a^3$ will engage the edges of the channel-piece at the ends of said opening and thus hold the two ends of the tread portion together. To lock the said fastening-strips in position in the opening $b^2$ and prevent the same from springing out of the same, they are arranged to be held in position by means of a locking-bolt $d$, having a head $d^2$, arranged to overlie shoulders $a^4$, which are transverse to the shoulders $a^3$; the said shoulders $a^3$ and $a^4$ being preferably formed by permanently bending the strip, as shown, at substantially a right angle to the said inward projections $a^3$.

The bolt $d$ extends through a suitable opening in the rim $c$ and is provided with a nut $d^3$, whereby the same can be drawn tightly down upon the shoulders $a^4$, thus firmly holding the fastening device and tread portion in position.

From the foregoing description it will be seen that while it is practically impossible for the tire to become accidentally displaced said tire can be put on or taken off by an unskilled person without requiring any special appliances.

The metallic fastening device $a^2$ is of sufficient size not only to obviate all tendency to stretch, but also to add greatly to the strength of the tire without affecting in any way the resiliency of the rubber tread. The said fastening device is intended to be of such length that when the ends thereof are drawn into the opening in the channel-piece they will compress the rubber below to a certain extent, thus holding the same firmly in the said channel-piece, it being obvious, however, that the part of the tread between the actual tread-surface and the said fastening device is not in any way affected.

The tire embodying the invention is practically a combined steel and rubber tire, the fastening-strip constituting what may be termed an "inner steel tire" to afford the necessary strength to the structure as a whole, while the rubber tread portion, which is held in position by said strip, affords the desired resilience or cushioning effect.

I claim—

1. A tire comprising a channel-piece directly connected with the rim, a tread portion of resilient material supported in said channel-piece, a metallic fastening-strip or inner steel tire extending longitudinally through the said tread portion and provided at its ends with rigid shoulders to coöperate with engaging portions of the channel-piece to hold the said strip longitudinally, rigid horizontal shoulders at the end of said strip and a clamping device coöperating with said shoulders to hold the strip in engagement with said engaging portions, substantially as described.

2. A tire comprising the channel portion $b$ provided with the opening $b^2$, the tread portion $a$, a fastening-strip $a^2$ extending longitudinally through said tread portion and provided with the rigid vertical shoulders $a^3$ to engage the channel-piece at the edges of the opening $b^2$, the rigid horizontal shoulders $a^4$, and the locking-bolt $d$ coöperating with said shoulders $a^4$, substantially as described.

In testimony whereof I have signed my name to this specification in the presence of two subscribing witnesses.

OSBORN B. HALL.

Witnesses:
H. J. LIVERMORE,
NANCY P. FORD.